Jan. 26, 1965 S. W. ZOLDOK 3,166,800
HEAT REFLECTIVE INSULATION
Filed Sept. 19, 1960 2 Sheets-Sheet 1
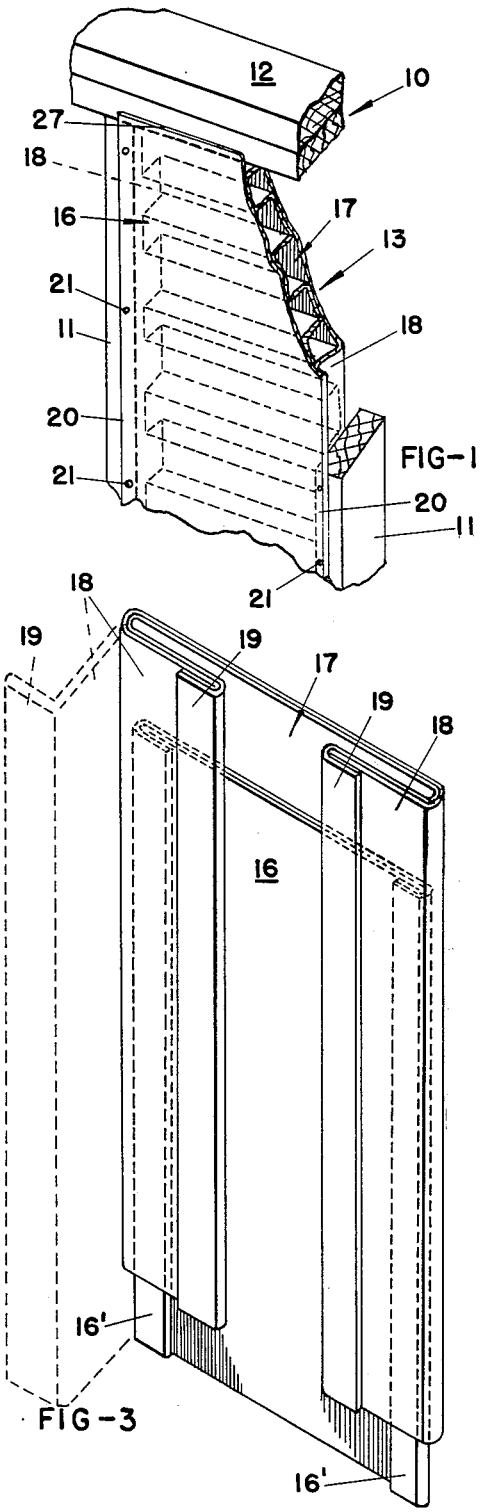
FIG-1
FIG-3
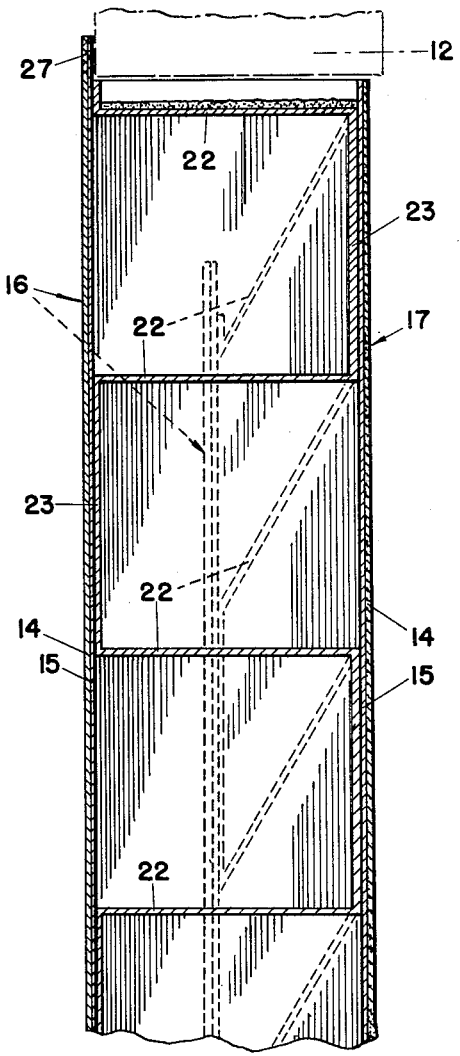
FIG-2
INVENTOR.
STEVE W. ZOLDOK
BY

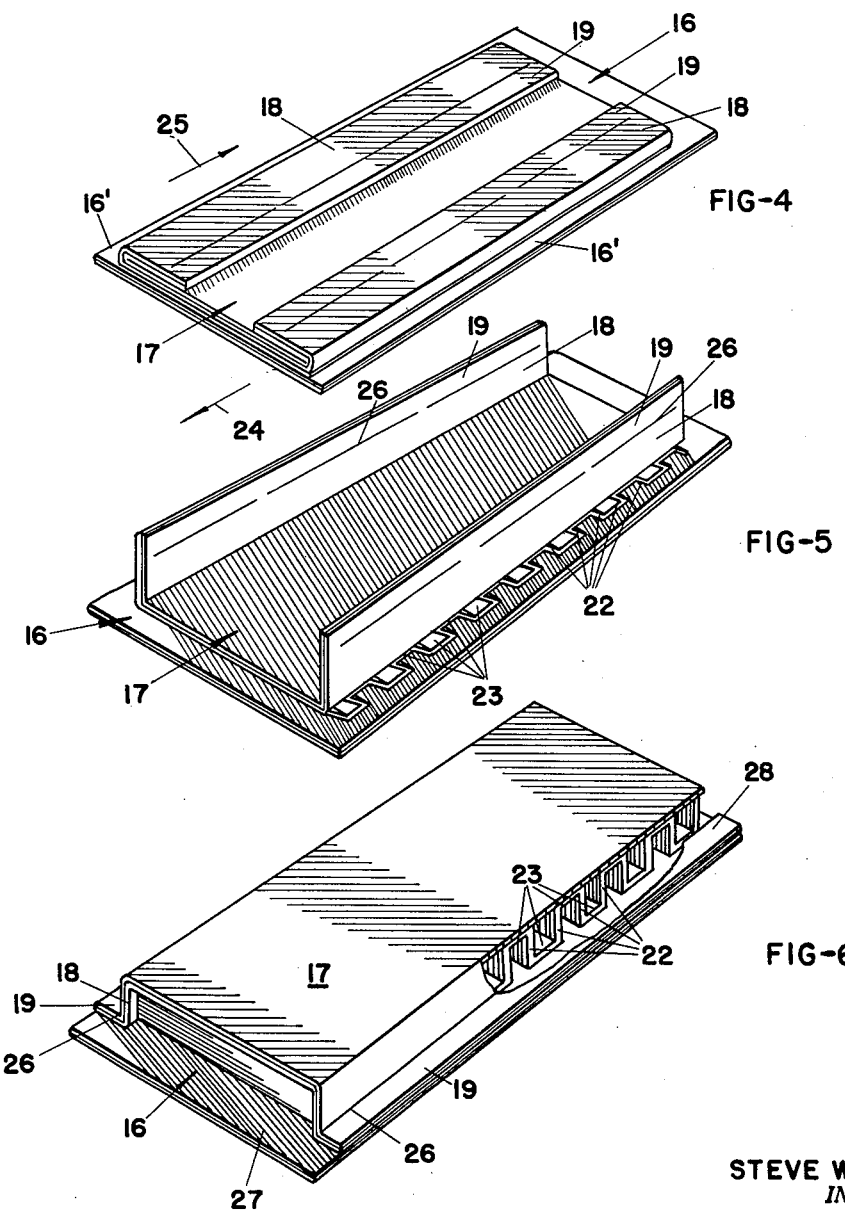

United States Patent Office 3,166,800
Patented Jan. 26, 1965

3,166,800
HEAT REFLECTIVE INSULATION
Steve W. Zoldok, 1425 E. 4th, Spokane, Wash.
Filed Sept. 19, 1960, Ser. No. 58,594
5 Claims. (Cl. 20—4)

My present invention relates to heat reflective insulation and more particularly insulation which can be made up in collapsed form and can be conveniently expanded and mounted in the structural members of a building.

The insulation material of the present invention is adapted to be rolled upon itself into a compact cylindrical roll for storage and transportation and comprises a number of sheets, at least one of which is reflective. The insulation may be unrolled and expanded for installation by attachment to adjacent structural members in a building.

In carrying out my invention, the insulation is folded in such a way that the finished product in flat form and any desired length may be rolled upon itself into a tight roll or may be folded by accordion pleats, for example, to form a compact mass for shipment or storage. It may be prepared in predetermined lengths suitable for the building structure in which it may be applied or in a comparatively long endless roll from which selected lengths may be cut as found necessary.

In use, a length of the insulation is expanded by applying longitudinal force to the companion face and back sheets in opposite directions. Since the sheets are interconnected by means of spacing members which are coincident in size and shape and are disposed parallel with respect to each other, and extend from side to side of the insulation, when tension is applied to the sheets in opposite directions, the spacing members rotate from their folded position, in which they are substantially parallel to the face and back sheets, to the expanded position in which they are disposed perpendicular to the face and back sheets, resulting in a heat reflective insulation of predetermined dimensions which will fit snugly in the framework of a building and has means for attachment to adjacent structural members thereof.

The invention provides an insulation of the character described which is simple in design, rugged in construction and economical in manufacture. Other objects and advantages of the present invention will become apparent during the course of the following description when considered in conjunction with the accompanying drawings.

For a full understanding of the nature and objects of the present invention, reference should be had to the said accompanying drawings wherein like numerals are employed to designate like parts and in which:

FIGURE 1 is a fragmentary perspective view having portions broken away and showing the expanded insulation positioned and attached to adjacent structural members in a building;

FIGURE 2 is a fragmentary sectional view of the expanded insulation;

FIGURE 3 is a perspective view of the insulation in its folded form;

FIGURE 4 is a perspective view of the insulation showing a modified manner of folding, thus resulting in insulation in the flat form;

FIGURE 5 is a perspective view of the insulation of FIGURE 4 partially expanded; and FIGURE 6 is a perspective view of the insulation of FIGURE 4 in its fully expanded form and having portions broken away for convenience of illustration.

The numeral 10 indicates, in their entirety, structural members in a building, which may include vertical studs 11, top plate 12, and a bottom plate (not shown). Obviously, these members may be ceiling rafters or other adjacent structural members to which the insulation material may be attached for the avowed purpose.

The insulation indicated in its entirety by the numeral 13 is of the heat reflective type, wherein at least one of the members or sheets is provided with heat reflective metallic foil or metalized paper as is disclosed in particular in FIGURE 2, wherein the metal foil is indicated by the numeral 14 and the backing paper is indicated by the numeral 15. It will be understood that only one sheet, both sheets or all members of the present insulation may be comprised of the heat reflective material as desired without altering the scope of the present invention. Obviously, if all of the members of the present insulation were comprised of the heat reflective material there would be at least three layers of material having reflective surfaces through the insulation.

Referring now in particular to FIGURE 1 of the drawing, the heat reflective insulation 13 is seen to be comprised of an elongated face sheet 16 and a back sheet 17. The face sheet is shown to have a dimension such that each of its four marginal edge portions may overlie adjacent structural members 11 and 12.

The back sheet 17 is of a dimension adapted to enter between said adjacent structural members of a building 11 and 12 and is provided along its longitudinal edges with vertical end posts 18—18 which terminate along their longitudinal edges in fins 19—19.

In the flat construction of FIGURE 3 it will be seen that the face sheet 16 has its vertical marginal edge portions folded inwardly upon itself while the end posts 18 are folded around and over the edges of the face sheet 16. The fins 19 may be folded back upon the end posts 18 as shown in FIGURE 3 or may be left coplanar with the end posts as shown at FIGURE 4.

When the insulation is in its expanded form, the fins 19 are superimposed upon the vertical marginal edges 16' of the face sheet 16 and together therewith constitute reinforced stapling flanges 20 through which staples 21 are driven to secure the insulation to the said structural members.

Plural spacing members 22 are hingedly secured at their side edges to the inner sides of the face sheet and back sheet 16 and 17 and extend from one said end post 18 to the other, perpendicular to the end post and the face and back sheets when in the expanded position, and substantially in a coplanar position which is parallel to the face and back sheet 16 and 17 when in the flat form.

The plural spacing members are interconnected by integral tie spacers 23 which extend from the side edges of the spacing members 22 between successive spacing members and alternate side edges thereof. These tie spacers 23 are adhesively or otherwise secured to the inner sides of said face and back sheets 16 and 17.

It will thus be seen that when tension is applied to the face and back sheets 16 and 17 in opposite longitudinal directions as shown by the arrows 24 and 25 the spacing members 23 will rotate to the position wherein they are perpendicular to the face and back sheets 16 and 17 as seeen in FIGURES 2 and 6. The end posts 18 will rotate 270° from the initial flat position of FIGURE 4 to the expanded position of FIGURE 6. While the fins 19 are rotated along the score or hinge line 26 to the position wherein they are superimposed upon the longitudinal marginal edges of the face sheet at which time the insulation is disposed in its expanded form and may be applied to the adjacent structural members of a building.

It will be noted, that, if desired, the face sheet 16 may be sufficiently elongated to provide end stapling flanges 27 and 28 for securing to structural members as seen at 12 in FIGURE 1.

By this construction it will be seen that I have provided a plurality of horizontally extended air spaces defined vertically by the spacing members 22 thus providing dead air spaces which enhance the reflective insulation qualities of the insulation.

Having thus described my invention, I desire to secure by Letters Patent of the United States the following:

1. A foldable reflective insulation, comprising in expanded form, an elongated flat face sheet adapted for its vertical marginal edge portions to overlie adjacent structural members in a building; a flat back sheet in spaced parallel relation to said face sheet and adapted to enter between the said adjacent structural members in a building; at least one of said sheets being reflective; vertical end posts having their bases hingedly connected to said back sheet at its vertical marginal edges and extending the full length thereof substantially perpendicular to said face and back sheets; there being a right angle fin on each post superimposed upon the longitudinal marginal edge portions of said face sheet and together therewith constituting reinforced stapling flanges; and plural parallel spacing members hingedly secured at their side edges to said face and back sheets and extending from one said end post to the other perpendicular thereto, and forming plural enclosed single cavity air spaces extending laterally of said insulation, whereby relative longitudinal movements of said face and back sheets will cause said spacing members to rotate and effect movement of said sheets between a folded position wherein said sheets and spacing members are substantially parallel and the expanded position.

2. The insulation of claim 1 in which the plural spacing members are interconnected by integral tie spacers at their side edges; said tie spacers being at alternate side edges between successive spacing members and fixed to the inner side faces of said face and back sheets.

3. The insulation of claim 1 in which the face sheet extends beyond the back sheet to form stapling flanges at the ends thereof.

4. A heat reflective insulation of extended length in flat form, comprising; an elongated face sheet having marginal edges adapted for attachment to adjacent structural members in a building; a back sheet parallel to said front sheet, at least one of said sheets being reflective; end posts overlying portions of said back sheet in juxtaposition and hingedly connected to the longitudinal side edges of said back sheet to rotate the posts substantially 270° to positions at right angles to said back sheet; fins on the free edges of said posts hingedly connected thereto to rotate to a position at right angles to their respective posts; and plural spacing members hingedly secured at their side edges to said face and back sheets and extending laterally between said posts and movable from coplanar positions parallel to said face and back sheets to positions perpendicular thereto and in spaced parallel relationship to each other, to expand said insulation and form laterally disposed single cavity air spaces defined by said front and back sheets and end posts.

5. The insulation of claim 4 in which plural spacing members are interconnected by integral tie spacers at their side edges; said tie spacers being at alternate side edges between successive spacing members and fixed to the inner side faces of said face and back sheets.

References Cited in the file of this patent
UNITED STATES PATENTS

| | | |
|---|---|---|
| 2,101,836 | Benedict | Dec. 14, 1937 |
| 2,229,743 | Karcher | Jan. 28, 1941 |
| 2,312,301 | Turner et al. | Mar. 2, 1943 |
| 2,839,789 | Adams | June 24, 1958 |
| 2,879,554 | Wheeler | Mar. 31, 1959 |
| 2,943,965 | Stogre | July 5, 1960 |
| 2,955,063 | Driscoll | Oct. 4, 1960 |
| 3,012,603 | Newsome | Dec. 12, 1961 |